T. W. HAWLEY.
SPRING WHEEL.
APPLICATION FILED MAR. 24, 1913.
1,103,045.
Patented July 14, 1914.
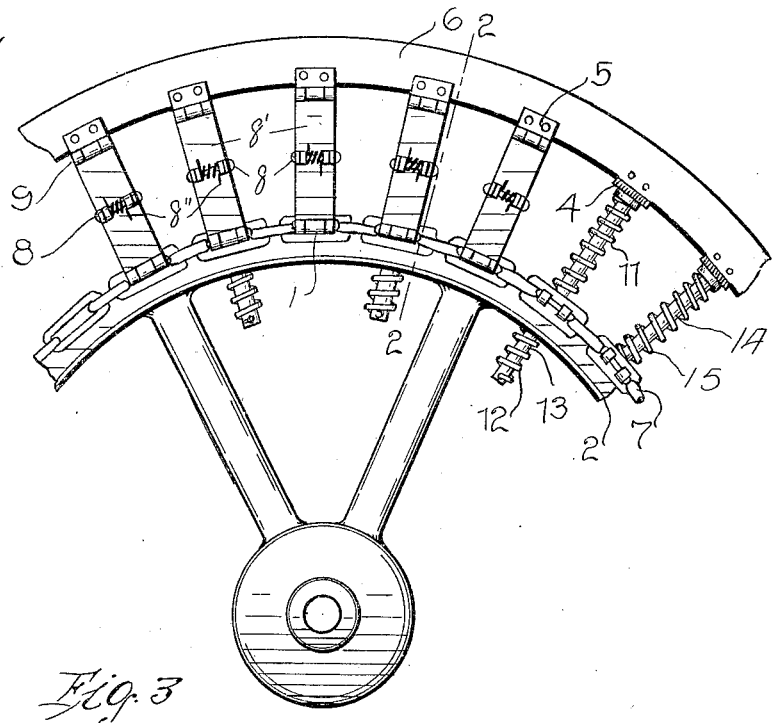
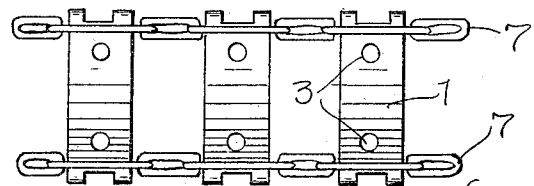
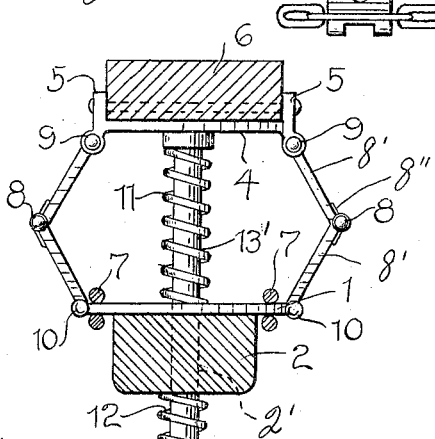 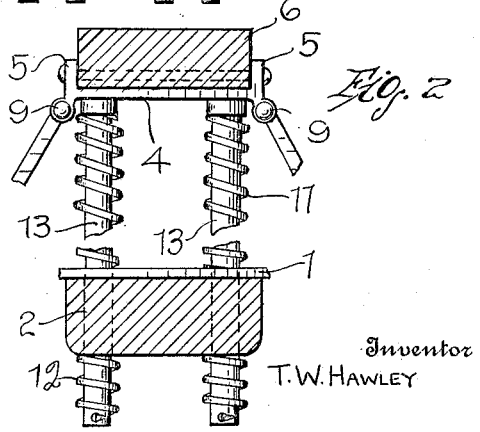
Inventor
T. W. HAWLEY
Witnesses
Robert M. Sutphen
A. I. Hind.
By Watson E. Coleman
Attorney

UNITED STATES PATENT OFFICE.

THORNTON WOODROW HAWLEY, OF OAKLAND, CALIFORNIA.

SPRING-WHEEL.

1,103,045.

Specification of Letters Patent. Patented July 14, 1914.

Application filed March 24, 1913. Serial No. 756,529.

*To all whom it may concern:*

Be it known that I, THORNTON WOODROW HAWLEY, a citizen of the United States, residing at Oakland, in the county of Alameda and State of California, have invented certain new and useful Improvements in Spring-Wheels, of which the following is a specification, reference being had to the accompanying drawings.

This invention comprehends certain new and useful improvements in spring wheels and has for a primary object to provide a spring wheel which will be of extremely simple construction and highly efficient in use and which will be composed of connected tire supporting plates which have their opposite ends hinged to inner rim plates through which the plungers project with the coil spring engaged therearound for resiliently retaining the tire supporting plates in their outermost positions.

Another object is to provide a spring wheel of this character which will be highly efficient and effective in use and which may be readily and cheaply manufactured.

With the above and other objects in view, this invention consists in the novel features of construction, combination and arrangement of parts which will be hereinafter more fully described, claimed and illustrated in the accompanying drawings, in which—

Figure 1, is a fragmentary side elevation of a wheel constructed according to my invention. Fig. 2, is a cross sectional view on the line 2—2 of Fig. 1. Fig. 3, is a plan view, showing several of the lower plates connected by the parallel connecting chains. Fig. 4, is a view similar to Fig. 2, showing a slightly modified form of my invention.

Referring more specifically to the drawings in which similar reference characters designate corresponding parts throughout the several views, 1 indicates the flat plates which are secured transversely upon the wheel rim 2 and extend beyond either side of said rim and are provided with the openings 3 adjacent their opposite ends, the purpose of which will presently appear.

Positioned outwardly of and parallel to the plates 1 are the outer tire carrying plates 4 having the outwardly directed flanges 5 upon their opposite ends between which the rubber tire 6 is received.

The inner plates 1 are connected adjacent their opposite ends by the spaced chains 7, each plate 1 being positioned through one link of each chain, as clearly shown on the drawings. The opposite ends of each plate 4 are connected with the corresponding ends of the inner plate 1 opposite the same by means of the toggle joints 8, the inner ends of the plates 8' forming each toggle joint being connected by a spring hinge 8'', while the outer or free ends of said plates are hinged respectively, to the outer plates 4 and inner plates 1, as shown at 9 and 10, respectively.

It will be understood that each hinge joint 8 is provided with a spring 8'' which tends to resiliently retain the sections 8' of the hinge joint in the relative position shown in Fig. 4.

The outer plates 4 are resiliently retained in their outer positions and spaced from the inner plates 1, by means of the coil springs 11 and 12 positioned around the plungers 13 above and below the lower plates 1 and rim 2. The outer ends of the plungers 13 are secured to the inner faces of certain of the outer plates 4 and said plungers extend through the openings 3 in the inner plates 1, it being understood that suitable openings are provided through the rim 2, and that the openings 3 in the inner plates 1 are inwardly of the edges of said rim.

I have provided a series of shorter plungers 14 secured by their outer ends to the inner faces of the remaining outer plates 4 and alternating with the longer plungers 13, said shorter plungers 14 having the springs 15 engaged therearound between the outer plates 4 and inner plates 1, it being understood that the inner ends of the plungers 14 are engaged in suitable openings provided in the inner plates 1 opposite the outer plates by which said shorter plungers are carried and in the rim 2.

It will be seen that the springs 11 and 12 will resiliently retain the outer plates 4 and the tire 6 in proper position and will absorb all shocks incident to the tire 6 engaging a stone or other obstruction or engaging in a depressed portion or sunken portion of the road. It will also be seen that owing to the length of the plungers 13 and the strength of the springs 11 and 12, the central hinges of the toggle-joint 8 will be normally retained outwardly of the opposite ends 9 and 10 of said toggle joint, as clearly shown on the drawings and the purpose of which will clearly be apparent. It will also be understood that the plungers 13 are arranged in pairs, two plungers being carried by each outer plate 4.

In the modified form shown in Fig. 4 I have shown each outer plate 4 as carrying only one plunger 13' secured near the center of the plate and extending through the central opening 3 in the corresponding inner plate 10 and through a communicating opening 2' in the rim 2. The arrangement of the springs 11 and 12 is the same, however, as in the preferred form and it will be evident that the operation of the parts will be substantially the same as in the form in which two plungers are carried by each plate 4.

Having thus described my invention, what I claim is:—

A spring wheel comprising the combination with a rim, of transverse inner plates positioned across the rim, chains upon opposite sides of the rim for connecting the inner plates, the ends of each inner plate being extended through the links of the chains, with outer plates having upstanding flanges at their opposite ends, the lower edges of the flanges extending slightly below the outer plates, jointed hinge plates secured to the outer extremities of the inner plates and the depending edges of the flanges at the opposite ends of the outer plates, a tread member engaged upon the outer plates between the flanges thereof, pins carried by the outer plates and engaged through the inner plates and the rim, and springs engaged around the pins and bearing against the inner face of the rim and the outer faces of the inner plates.

In testimony whereof I hereunto affix my signature in the presence of two witnesses.

THORNTON WOODROW HAWLEY.

Witnesses:
W. R. BROOKS,
W. J. AGNEW.